(12) United States Patent
Sonokawa et al.

(10) Patent No.: US 10,167,734 B2
(45) Date of Patent: Jan. 1, 2019

(54) BUFFER AIRFLOW TO BEARING COMPARTMENT

(71) Applicant: United Technologies Corporation, Hartford, CT (US)

(72) Inventors: Masayoshi Sonokawa, West Hartford, CT (US); Russell B. Witlicki, Wethersfield, CT (US); Christopher J. Larson, Newfield, ME (US); Robert C. Stutz, Dobbs Ferry, NY (US); Eric Charles Mundell, South Berwick, ME (US); Marc J. Muldoon, Marlborough, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 544 days.

(21) Appl. No.: 14/427,679

(22) PCT Filed: Mar. 15, 2013

(86) PCT No.: PCT/US2013/031864
§ 371 (c)(1),
(2) Date: Mar. 12, 2015

(87) PCT Pub. No.: WO2014/051691
PCT Pub. Date: Apr. 3, 2014

(65) Prior Publication Data
US 2015/0240660 A1    Aug. 27, 2015

Related U.S. Application Data

(60) Provisional application No. 61/706,246, filed on Sep. 27, 2012.

(51) Int. Cl.
*F01D 25/08*     (2006.01)
*F01D 25/12*     (2006.01)
(Continued)

(52) U.S. Cl.
CPC ........... *F01D 25/125* (2013.01); *F01D 25/08* (2013.01); *F01D 25/12* (2013.01); *F01D 25/14* (2013.01);
(Continued)

(58) Field of Classification Search
CPC ...... F01D 11/001; F01D 11/005; F01D 25/08; F01D 25/12; F01D 25/125; F01D 25/14;
(Continued)

(56) References Cited

U.S. PATENT DOCUMENTS 3,528,241 A * 9/1970 Venable .................... F02C 7/06
                                                            60/39.08
3,965,066 A * 6/1976 Sterman .................. F01D 9/023
                                                            415/115

(Continued)

FOREIGN PATENT DOCUMENTS

EP       0127562 B1    8/1990
GB       2401912 A     11/2004

OTHER PUBLICATIONS

European Search Report for EP Application No. 13841366.1 dated Jul. 29, 2016.
(Continued)

*Primary Examiner* — Logan Kraft
*Assistant Examiner* — Christopher R Legendre
(74) *Attorney, Agent, or Firm* — Carlson, Gaskey & Olds, P.C.

(57) ABSTRACT

A seal support and duct assembly of a gas turbine engine includes a seal support housing disposed about a central axis, a duct housing attached to the seal support housing, the duct housing and the seal support housing defining the seal support and duct assembly, an outer annular cavity, an inlet that supplies the outer annular cavity with cooling buffer air, an inner annular cavity disposed radially inward of the outer
(Continued)

annular cavity, a first plurality of outlets that provide the cooling buffer air from the outer annular cavity to the inner annular cavity, and a second plurality of outlets that provide the cooling buffer air from the inner annular cavity to an area surrounding a bearing compartment.

17 Claims, 2 Drawing Sheets

(51) Int. Cl.
*F01D 25/14* (2006.01)
*F01D 25/16* (2006.01)
*F01D 25/24* (2006.01)
*F02C 7/06* (2006.01)
*F02C 7/18* (2006.01)

(52) U.S. Cl.
CPC ............ *F01D 25/16* (2013.01); *F01D 25/162* (2013.01); *F01D 25/24* (2013.01); *F02C 7/06* (2013.01); *F02C 7/18* (2013.01); *F05D 2220/32* (2013.01); *F05D 2240/50* (2013.01); *F05D 2260/232* (2013.01); *Y02T 50/675* (2013.01)

(58) Field of Classification Search
CPC ........ F01D 25/16; F01D 25/162; F01D 25/24; F02C 7/06; F02C 7/18; F05D 2240/50
See application file for complete search history.

(56) References Cited

U.S. PATENT DOCUMENTS

| | | | |
|---|---|---|---|
| 4,156,342 A | 5/1979 | Korta et al. | |
| 4,451,200 A | 5/1984 | Libertini et al. | |
| 4,542,623 A | 9/1985 | Hovan et al. | |
| 4,907,943 A | 3/1990 | Kelch | |
| 5,415,478 A | 5/1995 | Matthews et al. | |
| 6,761,034 B2 * | 7/2004 | Niday | F01D 5/08 415/171.1 |
| 6,966,191 B2 * | 11/2005 | Fukutani | F01D 3/02 60/39.08 |
| 7,252,474 B2 | 8/2007 | Belokon et al. | |
| 7,383,686 B2 | 6/2008 | Aycock et al. | |
| 7,435,052 B2 | 10/2008 | Spencer et al. | |
| 7,748,209 B1 | 7/2010 | Schopf et al. | |
| 7,882,696 B2 | 2/2011 | Anderson et al. | |
| 2004/0239050 A1 * | 12/2004 | Antunes | F01D 9/023 277/630 |
| 2006/0062499 A1 | 3/2006 | Boyd | |
| 2006/0123796 A1 | 6/2006 | Aycock et al. | |
| 2006/0267290 A1 | 11/2006 | Spencer et al. | |
| 2009/0000304 A1 | 1/2009 | Anderson et al. | |
| 2015/0240660 A1 * | 8/2015 | Sonokawa | F02C 7/18 415/111 |

OTHER PUBLICATIONS

International Preliminary Report on Patentability for PCT Application No. PCT/US2013/031864, dated Apr. 9, 2015.
International Search Report and Written Opinion for International Application No. PCT/US2013/031864 dated Jun. 21, 2013.

* cited by examiner

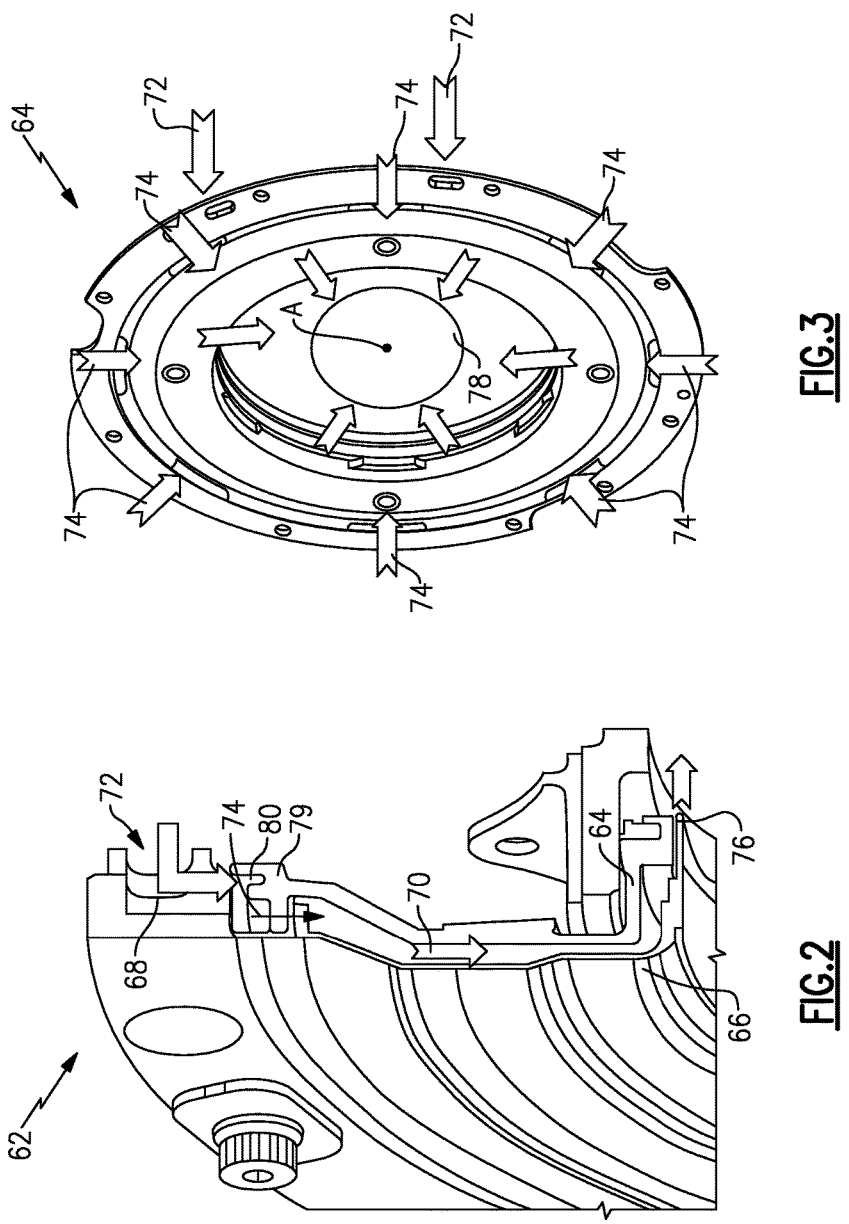

BUFFER AIRFLOW TO BEARING COMPARTMENT

REFERENCE TO RELATED APPLICATIONS

This application claims priority to U.S. Provisional Patent Application No. 61/706,246 filed Sep. 27, 2012.

BACKGROUND OF THE INVENTION

A gas turbine engine includes bearings that support rotation of shafts. The bearings require lubricant and are maintained at a desired temperature by flowing a cooling buffer airflow. A pressure outside of a bearing compartment that contains the bearings is maintained at a higher pressure than the pressure within the bearing compartment to assist in retaining the lubricant within the bearing compartment. An efficient supply and exhaust of cooling buffer air to the bearing compartment improves overall engine operation efficiency and durability.

The bearing compartment is covered by a duct and a seal support that directs the cooling buffer airflow towards the bearing compartment to separate the bearing compartment from the surrounding high temperature air, preventing the bearing compartment from becoming too hot. The duct and the seal support define a bearing support assembly including one or two buffer air inlet ports. The cooling buffer air fills the space between the duct and the seal support and is then discharged from an inner diameter of the bearing support assembly. Because of the limited number of buffer air inlet ports, the buffer air does not uniformly fill the space between the duct and the seal support before discharging. This can cause non-uniform temperature distribution within the space between the duct and the seal support and can cause high temperatures in the bearing compartment.

SUMMARY OF THE INVENTION

A seal support and duct assembly of a gas turbine engine according to an exemplary embodiment of this disclosure, among other possible things, includes a seal support housing disposed about a central axis, a duct housing attached to the seal support housing, the duct housing and the seal support housing defining the seal support and duct assembly, an outer annular cavity, an inlet that supplies the outer annular cavity with cooling buffer air, an inner annular cavity disposed radially inward of the outer annular cavity, a first plurality of outlets that provide the cooling buffer air from the outer annular cavity to the inner annular cavity, and a second plurality of outlets that provide the cooling buffer air from the inner annular cavity to an area surrounding a bearing compartment.

In a further embodiment of any of the foregoing seal support and duct assemblies, a bearing is contained within the bearing compartment.

In a further embodiment of any of the foregoing seal support and duct assemblies, the seal support and duct assembly is employed with at least one of a combustor, a high pressure turbine, or a low pressure turbine.

In a further embodiment of any of the foregoing seal support and duct assemblies, the inlet includes two inlets.

In a further embodiment of any of the foregoing seal support and duct assemblies, the cooling buffer air enters the inlet in an axial direction and is then directed radially to the outer annular cavity.

In a further embodiment of any of the foregoing seal support and duct assemblies, the outer annular cavity includes a dam between the inlet and the first plurality of outlets, and the cooling buffer air is distributed uniformly within the dam.

In a further embodiment of any of the foregoing seal support and duct assemblies, the first plurality of outlets supply the cooling buffer air in a radial direction into the inner annular cavity for uniform distribution within the inner annular cavity.

In a further embodiment of any of the foregoing seal support and duct assemblies, the first plurality of outlets are evenly spaced about the central axis.

In a further embodiment of any of the foregoing seal support and duct assemblies, the second plurality of outlets are evenly spaced about the central axis.

In a further embodiment of any of the foregoing seal support and duct assemblies, the cooling buffer air is provided axially through the second plurality of outlets.

A seal support and duct assembly of a gas turbine engine according to an exemplary embodiment of this disclosure, among other possible things, includes a seal support housing disposed about a central axis. A duct housing is attached to the seal support housing. The duct housing and the seal support housing define the seal support and duct assembly. An inlet supplies the outer annular cavity with cooling buffer air. An outer annular cavity includes a dam. The cooling buffer air is distributed uniformly within the dam. An inner annular cavity is disposed radially inward of the outer annular cavity. A first plurality of outlets provide the cooling buffer air from the dam of the outer annular cavity to the inner annular cavity. The first plurality of outlets are evenly spaced about the central axis, and the dam is located between the inlet and the first plurality of outlets. A second plurality of outlets provide the cooling buffer air from the inner annular cavity and to an area surrounding a bearing compartment. The second plurality of outlets are evenly spaced about the central axis. A bearing is contained within the bearing compartment.

In a further embodiment of any of the foregoing seal support and duct assemblies, the seal support and duct assembly is employed with at least one of a combustor, a high pressure turbine, or a low pressure turbine.

In a further embodiment of any of the foregoing seal support and duct assemblies, the inlet includes two inlets.

In a further embodiment of any of the foregoing seal support and duct assemblies, the cooling buffer air enters the inlet in an axial direction and is then directed radially to the outer annular cavity.

In a further embodiment of any of the foregoing seal support and duct assemblies, the first plurality of outlets supply the cooling buffer air in a radial direction into the inner annular cavity for uniform distribution within the inner annular cavity.

In a further embodiment of any of the foregoing seal support and duct assemblies, the cooling buffer air is provided axially through the second plurality of outlets.

These and other features of the present invention can be best understood from the following specification and drawings, the following of which is a brief description.

BRIEF DESCRIPTION OF THE DRAWINGS

FIG. 2 illustrates a perspective view of a seal support and duct assembly; and

FIG. 3 illustrates a perspective view of a buffer air flow scheme.

DETAILED DESCRIPTION OF THE PREFERRED EMBODIMENTS

Figure 1:
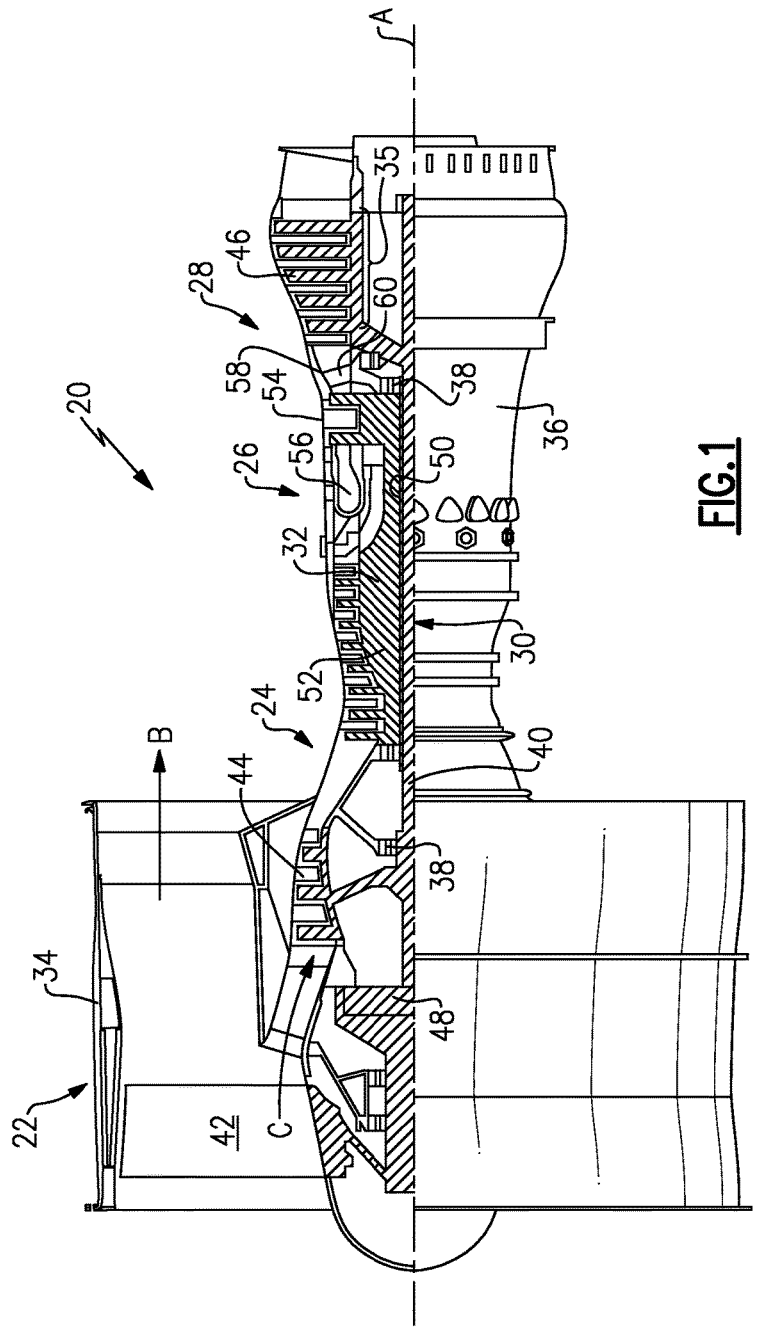
FIG. 1 illustrates a schematic view of an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 34, while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor 44 to a low pressure (or first) turbine 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor 52 and a high pressure (or second) turbine 54. The inner shaft 40 and the outer shaft 50 are concentric and rotate via the bearing systems 38 about the engine central longitudinal axis A which is collinear with their longitudinal axes.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52, mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 35. In another non-limiting example embodiment, the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 35 in the low pressure turbine 46 and the number of blades 42 in the fan section 22 disclose an example gas turbine engine 20 with increased power transfer efficiency.

At least some of the bearings of the bearing systems 38 are contained within a bearing compartment 78 (shown in FIG. 3) and are supplied with lubricant. Cooling buffer air maintains the bearings of the bearing systems 38 at a desired temperature. The cooling buffer air flows within the bearing compartment 78 to cool the bearings and to retain the lubricant around the bearings. The cooling buffer air is provided from one or more compressor stages.

FIG. 2 illustrates a seal support and duct assembly 62 that surrounds the bearing compartment 78. The bearing compartment 78 is surrounded by high temperature air. The seal support and duct assembly 62 includes a seal support housing 64 (further shown in FIG. 3) and a duct housing 66 that are attached to or cooperates with a bearing support. The seal support and duct assembly 62 receives and directs the cooling buffer air to separate the bearing compartment 78 from the high temperature surroundings, reducing the temperature of the bearing and in the bearing compartment 78. In one example, the seal support and duct assembly 62 is employed with the bearing systems 38 in the combustor 56, the high pressure turbine 54, and/or the low pressure turbine 46.

An outer annular cavity 68 and an inner annular cavity 70 are defined between the seal support housing 64 and the duct housing 66. The outer annular cavity 68 is disposed radially outward of the inner annular cavity 70. The cooling buffered air flows through an external inlet 72 and into the outer annular cavity 68. In one example, there are two external inlets 72 that supply the cooling buffer air into the outer annular cavity 68. The cooling buffer air enters the external inlet 72 in an axial direction substantially parallel to the engine central longitudinal axis A and is then directed radially into the outer annular cavity 68.

The outer annular cavity 68 defines a dam 80 between the external inlet 72 and the inner annular cavity 70. The dam 80 that assists with the substantially uniform distribution of cooling buffer air within the outer annular cavity 68.

A first plurality of outlets 74 are evenly disposed about an inner circumference 79 of the outer annular cavity 68 and uniformly supply the cooling buffer air in a radial direction into the inner annular cavity 70. Other than the first plurality of outlets 74, the outer annular cavity 68 and the inner annular cavity 70 are sealed relative to each other. As shown in FIG. 3, the first plurality of outlets 74 are evenly spaced about the central longitudinal engine axis A to circumferentially provide a uniform flow, temperature and pressure of the cooling buffer air into the inner annular cavity 70 for even distribution.

The cooling buffer air is then further distributed axially through a second plurality of outlets 76. The second plurality of outlets 76 are evenly spaced about the central longitudinal engine axis A to circumferentially provide a uniform flow, temperature and pressure of the cooling buffer air to an area outside of and surrounding the bearing compartment 78.

The seal support and duct assembly 62 includes the dam 80 which creates a relatively small annulus in the outer annular cavity 68 between the external inlet 72 and the first plurality of outlets 74. The first plurality of outlets 74 are circumferentially allocated to discharge the cooling buffer air uniformly into the inner annular cavity 70. The annulus of the inner annular cavity 70 is then filled with the cooling buffer air relatively quickly, and the cooling buffer air uniformly and circumferentially flows within the inner annular cavity 70 before being discharged at a uniform temperature and pressure through the second plurality of outlets 76 and into the bearing compartment 78.

Although a gas turbine engine 20 with geared architecture 48 is described, the seal support and duct assembly 62 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A seal support and duct assembly of a gas turbine engine comprising:
   a seal support housing that is disposed about a central longitudinal axis of the gas turbine engine and surrounds a bearing compartment that contains a bearing;
   a duct housing attached to the seal support housing;
   an outer annular cavity;
   at least one inlet, each of the at least one inlet comprising an opening in the outer annular cavity that supplies the outer annular cavity with cooling buffer air;
   an inner annular cavity disposed radially inward of the outer annular cavity;
   a first plurality of outlets that provide the cooling buffer air from the outer annular cavity to the inner annular cavity; and
   a second plurality of outlets that provide the cooling buffer air from the inner annular cavity to the bearing compartment;
   wherein the inner annular cavity and the second plurality of outlets are each defined by the duct housing and the seal support housing.

2. The seal support and duct assembly as recited in claim 1 wherein the seal support and duct assembly is employed with at least one of a combustor, a high pressure turbine, or a low pressure turbine.

3. The seal support and duct assembly as recited in claim 1 wherein the at least one inlet comprises two inlets.

4. The seal support and duct assembly as recited in claim 1 wherein the cooling buffer air enters the at least one inlet in an axial direction and is then directed radially to the outer annular cavity.

5. The seal support and duct assembly as recited in claim 1 wherein the outer annular cavity includes a dam between the at least one inlet and the first plurality of outlets, and the cooling buffer air is distributed uniformly within the dam.

6. The seal support and duct assembly as recited in claim 1 wherein the first plurality of outlets supply the cooling buffer air in a radial direction into the inner annular cavity for uniform distribution within the inner annular cavity.

7. The seal support and duct assembly as recited in claim 1 wherein the first plurality of outlets are evenly spaced about the central longitudinal axis.

8. The seal support and duct assembly as recited in claim 1 wherein the second plurality of outlets are evenly spaced about the central longitudinal axis.

9. The seal support and duct assembly as recited in claim 1 wherein the cooling buffer air is provided axially through the second plurality of outlets.

10. The seal support and duct assembly as recited in claim 1, wherein the second plurality of outlets provide the cooling buffer air from the inner annular cavity to an interior of the bearing compartment.

11. A seal support and duct assembly of a gas turbine engine comprising:
- a seal support housing that is disposed about a central longitudinal axis of the gas turbine engine and surrounds a bearing compartment;
- a duct housing attached to the seal support housing;
- an outer annular cavity;
- at least one inlet that supplies the outer annular cavity with cooling buffer air;
- the outer annular cavity including a dam, wherein the cooling buffer air is distributed uniformly within the dam;
- an inner annular cavity disposed radially inward of the outer annular cavity;
- a first plurality of outlets that provide the cooling buffer air from the dam of the outer annular cavity to the inner annular cavity, wherein the first plurality of outlets are evenly spaced about the central longitudinal axis, and the dam is located between the at least one inlet and the first plurality of outlets;
- a second plurality of outlets that provide the cooling buffer air from the inner annular cavity to the bearing compartment, wherein the second plurality of outlets are evenly spaced about the central longitudinal axis; and
- a bearing contained within the bearing compartment;
- wherein the inner annular cavity and the second plurality of outlets are each defined by the duct housing and the seal support housing.

12. The seal support and duct assembly as recited in claim 11 wherein the seal support and duct assembly is employed with at least one of a combustor, a high pressure turbine, or a low pressure turbine.

13. The seal support and duct assembly as recited in claim 11 wherein the at least one inlet comprises two inlets.

14. The seal support and duct assembly as recited in claim 11 wherein the cooling buffer air enters the at least one inlet in an axial direction and is then directed radially to the outer annular cavity.

15. The seal support and duct assembly as recited in claim 11 wherein the first plurality of outlets supply the cooling buffer air in a radial direction into the inner annular cavity for uniform distribution within the inner annular cavity.

16. The seal support and duct assembly as recited in claim 11 wherein the cooling buffer air is provided axially through the second plurality of outlets.

17. The seal support and duct assembly as recited in claim 11, wherein the second plurality of outlets provide the cooling buffer air from the inner annular cavity to an interior of the bearing compartment.

* * * * *